United States Patent
Delpuch (10) Patent No.: US 9,712,799 B2
(45) Date of Patent: Jul. 18, 2017

(54) METHOD AND APPARATUS FOR SELECTING COMPRESSION FOR AN INCOMING VIDEO SIGNAL IN AN INTERACTIVE TELEVISION SYSTEM

(75) Inventor: Alain Delpuch, Paris (FR)

(73) Assignee: OPENTV, INC., San Francisco, CA (US)

( * ) Notice: Subject to any disclaimer, the term of this patent is extended or adjusted under 35 U.S.C. 154(b) by 0 days.

(21) Appl. No.: 12/795,425

(22) Filed: Jun. 7, 2010

(65) Prior Publication Data
US 2010/0250774 A1 Sep. 30, 2010
US 2016/0249033 A9 Aug. 25, 2016

Related U.S. Application Data

(63) Continuation of application No. 10/652,096, filed on Aug. 29, 2003, now abandoned.
(Continued)

(51) Int. Cl.
*H04N 7/173* (2011.01)
*H04N 9/804* (2006.01)
*H04N 5/76* (2006.01)
*H04N 5/781* (2006.01)
*H04N 9/79* (2006.01)
(Continued)

(52) U.S. Cl.
CPC ............ *H04N 9/8042* (2013.01); *H04N 5/76* (2013.01); *H04N 5/781* (2013.01); *H04N 9/7921* (2013.01); *H04N 21/4147* (2013.01); *H04N 21/42661* (2013.01); *H04N 21/4334* (2013.01);
(Continued)

(58) Field of Classification Search
USPC .................................................... 725/58, 134
See application file for complete search history.

(56) References Cited

U.S. PATENT DOCUMENTS 6,470,378 B1 * 10/2002 Tracton et al. ............... 709/203
6,532,593 B1 * 3/2003 Moroney ...................... 725/142
(Continued)

FOREIGN PATENT DOCUMENTS

AU 2003268433 A1 3/2004
WO WO-2004023346 a2 3/2004

OTHER PUBLICATIONS

"U.S. Appl. No. 10/653,714, Advisory Action mailed Jan. 12, 2009", 3 pgs.
(Continued)

*Primary Examiner* — Kunal Langhnoja
(74) *Attorney, Agent, or Firm* — Schwegman, Lundberg & Woessner, P.A.

(57) ABSTRACT

A method and apparatus for applying a variable compression factor to an incoming video stream in an STB. An increased amount of video may be stored within a PVR or disk on a STB by reducing the data storage requirements of incoming video based on available storage space and the type and size of the incoming video bit stream. Included are real time compression, or reduction in storage space requirements, by various data reduction methodologies including removing bits from the incoming video stream to reduce the amount of storage required to store the video stream. A background data reduction or compression technique is also provided wherein the incoming video stream is stored and data is reduced or further compressed at a later time to reduce data storage requirements.

19 Claims, 6 Drawing Sheets

Related U.S. Application Data (60) Provisional application No. 60/406,997, filed on Aug. 29, 2002.

(51) Int. Cl.
  *H04N 21/4147* (2011.01)
  *H04N 21/426* (2011.01)
  *H04N 21/433* (2011.01)
  *H04N 21/4335* (2011.01)
  *H04N 21/4402* (2011.01)

(52) U.S. Cl.
  CPC ..... *H04N 21/4335* (2013.01); *H04N 21/4402* (2013.01)

(56) References Cited

U.S. PATENT DOCUMENTS

| | | | |
|---|---|---|---|
| 7,257,316 B2* | 8/2007 | Yamato et al. | 386/328 |
| 2001/0047517 A1* | 11/2001 | Christopoulos et al. | 725/87 |
| 2002/0110353 A1* | 8/2002 | Potrebic et al. | 386/46 |
| 2003/0237097 A1* | 12/2003 | Marshall et al. | 725/105 |

OTHER PUBLICATIONS

"U.S. Appl. No. 10/653,714, Final Office Action mailed Oct. 29, 2008", 14 pgs.

"U.S. Appl. No. 10/653,714, Final Office Action mailed Nov. 12, 2009", 15 pgs.

"U.S. Appl. No. 10/653,714, Non Final Office Action mailed Apr. 2, 2009", 13 pgs.

"U.S. Appl. No. 10/653,714, Non Final Office Action mailed Apr. 15, 2008", 12 pgs.

"Application U.S. Appl. No. 10/653,714, Non Final Office Action mailed Oct. 3, 2007", 28 pgs.

"U.S. Appl. No. 10/653,714, Response filed Jan. 3, 2008 to Non Final Office Action mailed Oct. 3, 2007", 13 pgs.

"U.S. Appl. No. 10/653,714, Response filed Jul. 2, 2009 to Non Final Office Action mailed Apr. 2. 2009", 19 pgs.

"U.S. Appl. No. 10/653,714, Response filed Jul. 15, 2008 to Non Final Office Action mailed Apr. 15, 2008", 15 pgs.

"U.S. Appl. No. 10/653,714, Response filed Dec. 29, 2008 to Final Office Action mailed Oct. 29, 2008", 20 pgs.

\* cited by examiner

METHOD AND APPARATUS FOR SELECTING COMPRESSION FOR AN INCOMING VIDEO SIGNAL IN AN INTERACTIVE TELEVISION SYSTEM

CROSS REFERENCE TO RELATED APPLICATIONS

This application is a continuation of U.S. application Ser. No. 10/652,096, entitled "Method and Apparatus for Selecting Compression for an Incoming Video Signal in an Interactive Television System", filed Aug. 29, 2003, which claims benefit of priority to U.S. Provisional Application No. 60/406,997, entitled "Method and Apparatus for Selecting Compression for an Incoming Video Signal in an Interactive TV Environment", filed Aug. 29, 2002, the entirety of both being incorporated herein by reference.

BACKGROUND OF THE INVENTION

Field of the Invention

The present invention is in the field of data compression and storage. In particular, the invention provides a method and apparatus for coding and transforming video signals for compressed storage for use with personal video recorders in an interactive television environment.

Description of the Related Art

New forms of television communication include the possibility of interactive television wherein a broadcaster can not only send its programs to the viewer, but the viewer can send information back to the broadcaster. Content from the broadcaster typically includes network programs and commercials, as well as web pages, interactive televised programs, graphics and text, and other items. At the same time, a viewer may communicate with a broadcaster or other entity (e.g., a third party website) via a television set-top box or similar device. Users/viewers may interact with the systems by ordering advertised products or services, requesting specialized information regarding particular programs, or navigating through pages of information.

At the center of this communications stream is a set-top box (STB) which receives the broadcast content. Generally speaking, the STB includes "middleware" and related software configured to control the flow of received broadcast programs, internet traffic, and data conveyed from the viewer. Also included in a viewer's STB (or coupled to the viewer's STB) may be the ability to record broadcast data for later use.

There are several methods currently in use by which viewers may record television broadcasts. One such method includes the use of a Video Cassette Recorder (VCR) which records received broadcasts onto video cassette tapes. Newer recording devices include Personal Video Recorders (PVR) which are typically coupled to a viewer's set-top box. PVRs typically include features that extend beyond the capabilities of conventional VCRs. One such feature is the ability to pause and rewind during the recording of a live broadcast. The recorded portion may then be viewed later or skipped to catch up to the real-time broadcast. Another possible use of the PVR is to record one television show while playing back another, previously recorded show. Typically, the PVR achieves these feats by recording compressed video signals on hard-disk drives so that they can be played back on command. However, PVRs have limited storage space (current typical values are about 40 Gigabytes). Moreover, a set top box (STB) which is configured to record may have even less storage when equipped with an integrated disk storage device.

One of the issues involved in recording programs concerns the quality of playback. Given a finite amount of recording space, there is a trade-off between the quantity of the signal one can record and its quality. To achieve higher quality, it is generally necessary to record more components of the signal being recorded and, in turn, use more space on the recording medium. Consequently, fewer high-quality images can be recorded on a medium than low-quality images.

In order to increase the amount of data which can be recorded onto a given medium, data compression techniques are frequently used. In the case of analog devices, varying levels of compression, and corresponding quality, may be chosen by a user. For example, VCR technology includes the possibility of recording at several levels of quality. VCR devices can currently be set to record at either lower or higher qualities. Creating a high quality recording generally requires more recording tape than does a low quality recording. Consequently, a viewer can record more programs at low quality settings that at high quality settings.

Other compression methods have been used with video file servers which may serve MPEGs requested by clients. Generally, the bit streams which are stored in these server libraries are typically coded at high quality levels and clients may request these video programs at different levels of video quality. However, the number of users and the quality of video delivered to the users is constrained by the outgoing channel capacity. To simultaneously accommodate the plurality of users who are demanding different levels of video quality, the video file server may scale the stored bit streams to a reduced bit rate. The video signals can then arrive as compressed data at the set-top box. In this instance, only the broadcaster needs to be equipped with the scaling hardware.

Newer television devices, including the set-top box and the PVR, have expanded the abilities of recording methods. New possibilities, such as playing back one recorded program while simultaneously recording another, are beyond the capabilities of the VCR. In order to support expanded abilities, the ability to record a greater amount of video within the STB storage or a digital PVR may be needed. There is also a desire for greater viewer control over the quality of the video stored in the viewer's PVR and to offer the consumer the opportunity for recording a greater number of hours with a smaller and less expensive storage device. Finally, in view of the above, there is a desire to make efficient use of the limited amount of disk space that is available in a PVR or similar device.

SUMMARY OF THE INVENTION

Described herein are methods and apparatus for compressing incoming video streams on an STB. In one embodiment, a client-server distributed computing system is configured to enable the storage of more data within the client. In one embodiment, the client-server distributed computing system comprises an interactive television system wherein broadcast data is stored on a viewer's STB or PVR. One contemplated embodiment provides for real time compression or data reduction by removing bits from the incoming data stream in order to reduce the amount of storage required to store associated content. Also contemplated is a background data reduction technique wherein the incoming data stream is first stored and then compressed (perhaps further compressed if already compressed) at a later time to reduce storage requirements. Also contemplated is the ability for a viewer to control the quality of stored video or data in the viewer's PVR. Consequently, it may be possible to offer consumers the ability to record content associated with more data without requiring more storage space.

BRIEF DESCRIPTION OF THE DRAWINGS

For a detailed understanding of the present invention, reference should be made to the following detailed description and accompanying drawings, in which like elements have been given like numerals, wherein.

DETAILED DESCRIPTION

The present invention relates to a PVR or similar storage device for use in a television system. While the following discussion describes additional compression of MPEG encoded signals, the methods and mechanisms are equally applicable to signals that have been encoded or compressed using other methods of encoding and/or compression. It is also noted that the present invention is also applicable to distributed computing systems other than interactive television systems.

Figure 1:
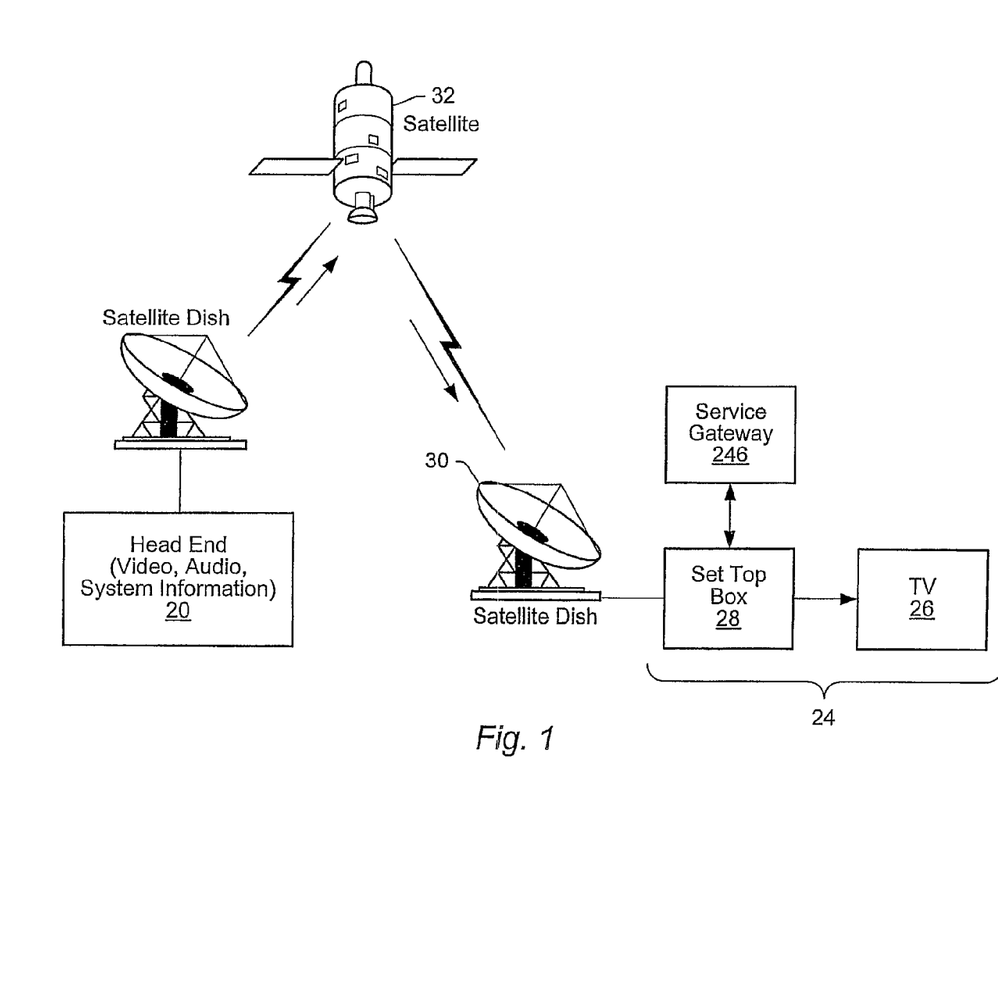
FIG. 1 illustrates an interactive television system as a host environment for the present invention.

Turning now to FIG. 1, one embodiment of an interactive television environment is shown. The system shown in FIG. 1 may generally be used for the transmission or distribution of audio-video-interactive signals including interactive television applications, television programs (audio and video) and system information (e.g. number of services, service names, event names, event schedules). The system shown includes a head-end server 20, which may be coupled to a video and audio device (not shown) that feeds a particular video and associated audio to the head-end 20. The audio-video-interactive signal may contain television programs or similar audio-video content, as well as other signals associated with interactive content such as control signals, system information, and interactive applications. The video information may be digitized at the head-end 20 and transmitted via a transmitter to a client receiving system 24 in various ways. For example, the transmitted information may be sent to the receiving system 24 via satellite transmission. Further, the receiving station 24 may be configured to receive signals via a modem channel, cable or terrestrial air waves. The client receiving system 24 may comprise, for example, a television 26 connected to a set top box 28, a personal digital assistant (PDA), a cellular phone, or any other electronic device capable of receiving electronic information. If satellite transmission is used, the STB 28 may include a receiving antenna 30 for receiving information from a satellite 32. The receiving station antenna 30 passes the interactive television signal to the client 28, which performs the processing functions of the receiving station 24. Once information is received through the receiving antenna 30, it may be processed and displayed on the television set 26. In this manner, audio, video, and interactive data may be received and processed. Signals which are conveyed to the receiving device 24 may embody modules which contain any type of data. For example, modules may include interactive application code, raw data, or graphical information in a coded bit stream, and may be configured to convey images, audio samples, or data objects.

In one embodiment as described herein, it is possible to re-adjust the compression level of a received data stream in order to adapt to a viewer's need, or desire, for minimizing the use of storage space in the viewer's PVR. In this manner, the set-top box may be configured to respond to the viewer's wish to balance storage space versus quality of the recording. This compression may be performed in real-time before the stream is stored on the PVR's mass storage device. Alternatively, this compression may be performed after the data has been stored.

One reason compressing the data at a later time, after it has already been stored, might be useful is that STBs typically have limited processing capability and may not be able to process and store data in real-time. Therefore, processing and compression may be performed at a later time, such as when the viewer is not using the PVR. As a second example, a viewer may specifically request such a recording to occur in the background, either as an implicit process or as explicitly requested. For example, a viewer may wish to expressly request compression of an old video stream rather than deleting it to free up space. In various embodiments, the age of a video and/or its type may be used as factors in deciding whether a stored or received video stream is a candidate for compression or reduction.

Figure 2:
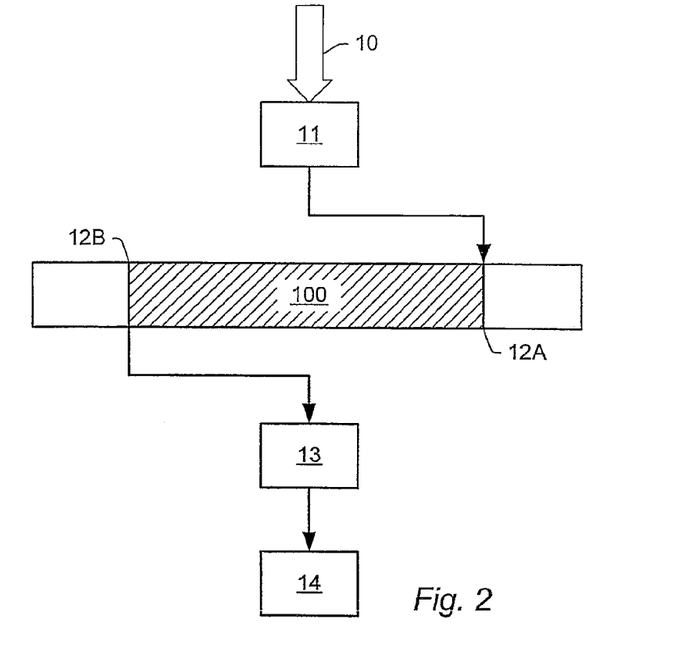
FIG. 2 illustrates a known method for receiving and decoding MPEG streams.

FIG. 2 shows an example of a currently known procedure by which an incoming MPEG encoded bit stream is captured, decoded and presented to the viewer. The incoming MPEG bit stream is typically sent from a head-end as a broadcast stream shown in FIG. 2 as transport stream 10. The stream is usually transmitted from a head end in an interactive television system that is well known in the art and thus not shown here. First, the incoming digitally encoded video data is extracted from the broadcast signal via a tuner, demultiplexer, or other such hardware 11 in a PVR or STB. Once acquired, the encoded data is placed in a bit stream buffer 100 at the position in the bit stream indicated as 12A. In the current example, an MPEG decoder 13 retrieves this data from the bit stream buffer at the bit stream position indicated by 12B. The MPEG decoder then decodes the video bit stream, decompresses it, and presents the decoded and decompressed MPEG video data to the video display 14 associated with the viewer's STB.

Figure 3:
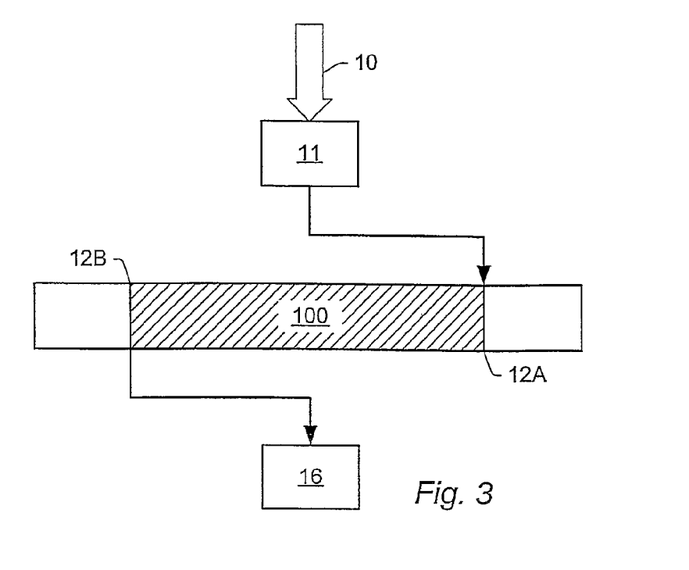
FIG. 3 illustrates a known method by which data is stored in the PVR.

FIG. 3 shows a currently known method in which the STB or PVR acquires and stores data. As in FIG. 2, the data is acquired from the transport stream 10 by the tuner 11 and sent to the buffer 100 at stream position 12A. The data is then taken from the buffer 100 at stream position 12B and sent to storage in the STB disk, PVR or other storage device 16. Generally speaking, very little processing occurs between the buffer and the STB or PVR. Some processing may occur in order to facilitate certain modes on play-back, but this is not an issue of data compression or data reduction for data storage efficiency.

Figure 4:
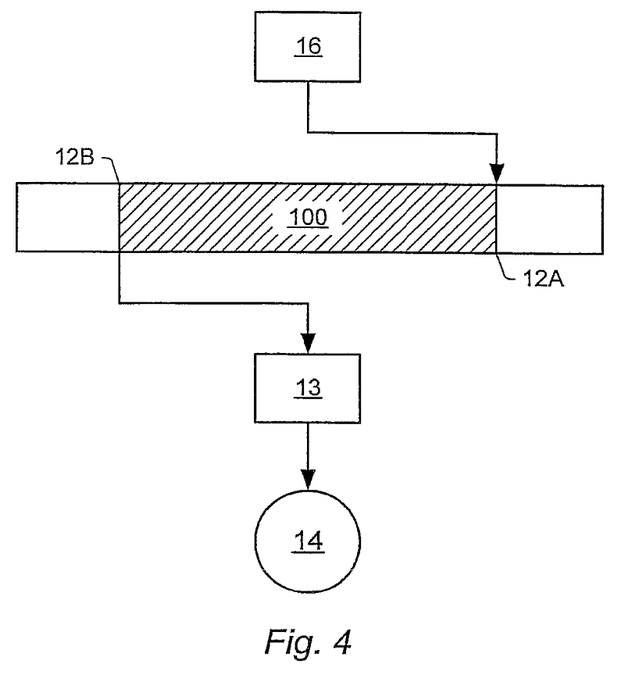
FIG. 4 illustrates a known method for a PVR to play back recorded audio-visual data.

FIG. 4 shows another known method by which recorded video streams are played back. Video data that is currently in the storage device 16 is sent to the buffer 100 at stream position 12A. From position 12A in the stream, data is read from the buffer at stream position 12B by the MPEG decoder 13, which decodes and decompresses the data and sends it to the video display 14.

Figure 5:
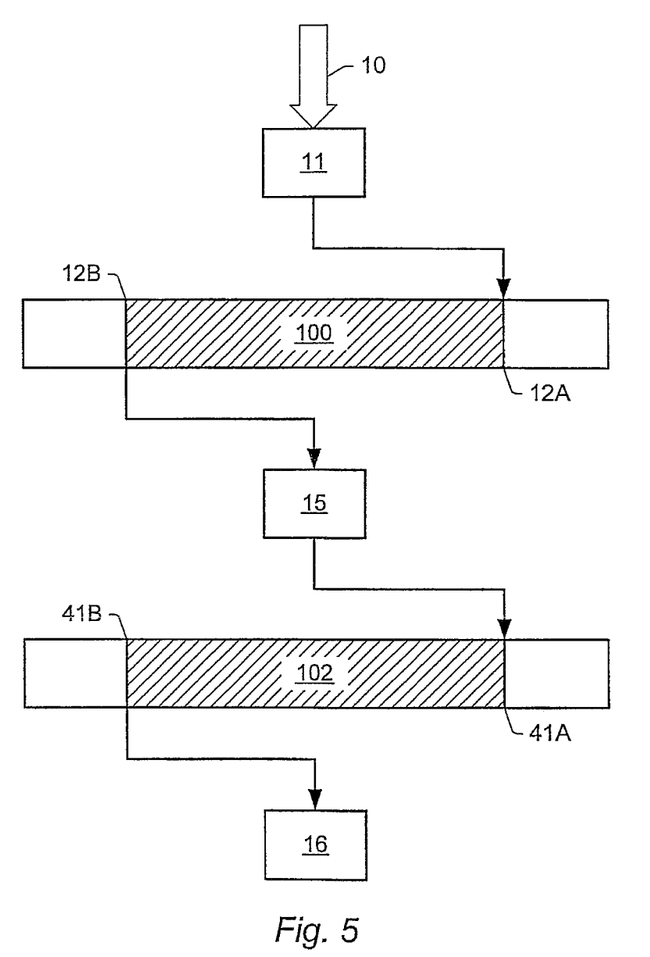
FIG. 5 illustrates a preferred embodiment of the present invention for application of a variable data reduction factor to incoming and stored video bit streams comprising video data in a STB or PVR.

FIG. 5 shows one embodiment wherein additional processing is performed. As shown in FIG. 5, data is pulled from the broadcast data stream 10 by the tuner 11 and is sent to the buffer 100 at stream position 12A. The additional element in FIG. 5 is the processor 15. The processor 15 pulls this data from the buffer 100 at stream position 12B, and upon processing, sends the processed resultant data to another position in the buffer, or to another buffer 102, at the stream position indicated as 41A. This processed data is now read from the buffer 102 at the stream position indicated as 41B and sent to the storage device 16.

Processor 15 may comprise an MPEG compressor in an STB which is capable of performing MPEG compression in real-time. Processor 15 may also operate to process the data in the background or at a later time, that is, after the MPEG video data is stored in the buffer or on the STB disk or PVR. In typical STBs which have limited processing capability and storage space, a less compute intensive methodology for data storage reduction may be utilized in Processor 15. For example, U.S. Pat. No. 5,889,561 (hereinafter '561), which is hereby incorporated by reference in its entirety, describes data reduction techniques wherein data is reduced in an MPEG encoded stream by removing high frequency block characteristics. These data reduction techniques of the '561 patent may be utilized in the STB in order to reduce the data storage requirements for an MPEG video stream without the requirement of decompressing and recompressing the MPEG video stream. There are a number of known variable data reduction schemes which are suitable for implementation in processor 15 for the PVR or STB disk, which are now available and suitable for meeting file size reduction and data reduction requirements.

In one embodiment, the user can select a level of data reduction based on the age of a program, or the type of program, and the amount of available storage. For instance, an STB user can selectively elect to capture incoming MPEG video streams in full resolution and store the incoming MPEG stream as a reduced storage program after playing back or viewing the incoming video stream. Of course, removing bits from the bit stream in order to perform the data reduction of the present invention may have some effect on the resolution and quality of the stored video. The STB or PVR user may also elect to periodically compress the video data stored on the STB disk or PVR in the background to reduce data storage requirements. For example, a program that has already been viewed may be selected for data reduction, a program that is older than a specified time may be further compressed or otherwise reduced to make room for more video storage space on the PVR or STB disk.

In one embodiment, STB or PVR storage space is allocated and an appropriate variable data reduction rate is automatically selected to reduce the data storage requirements to fit within the available storage space. For example, a program may be indicated to have a duration D, and incoming data rate Ri, from electronic program guide information. Such information may be included, for example, in an electronic information table (EIT) periodically transmitted to the user in the broadcast stream. Alternatively, the incoming data rate, Ri, may be calculated by the STB. The duration D may then be multiplied by the incoming data rate Ri to calculate an incoming data storage requirement Si. The available storage, Sa, or the target storage St (i.e., the amount of storage which the viewer desires to use for a particular data stream) in the STB disk or PVR is divided by incoming data storage requirement, Si, to calculate the variable data reduction factor, DRF, corresponding to a data reduction level that should be applied to the incoming data to reduce the data storage requirement to fit the data into the available storage Sa or target storage St. Thus, the data reduction factor, DRF is inversely proportional to the ratio of the target storage, St or the available storage, Sa divided by the incoming data storage requirement, Si. A user may also select different data storage reduction levels, 1–N, corresponding to discrete DRFs depending on program type or title.

For example, an STB or PVR user may utilize a larger DRF, eliminating relatively more data to reduce the data storage requirements and associated resolution for less critical viewing, such as for older programs, reruns or comedy programming in which the user may have less interest in visual detail or special visual effects only available at higher resolution data densities. The user may select a different DRF, for minimal reduction of data storage and resolution for sports programming in order to be able to track the movement of players and balls during golf, baseball, tennis or football. In one embodiment, the viewer may select a primary DRF which is generally applicable to all programming, and a second DRF to be applied for exceptions to the primary DRF. For example, sporting events may use the secondary DRF wherein the secondary DRF overrides the primary DRF. In addition to changing the DRF for different types of programs, the DRF may also be changed during a given program according to content. For example, commercials or advertisements can be detected and stored at a high DRF, stored in a separate portion of memory, or eliminated from storage altogether.

In one embodiment, an adaptive DRF is calculated and applied to the incoming video stream, and stored video streams, to achieve a balance between a desired level of data reduction, viewing resolution for the incoming video, and the existing level of data storage. For example, incoming video streams may initially be allocated a quantity of memory corresponding to a quantity of target storage, St. If the target storage, St is too small to accommodate an incoming video signal at a particular data rate, then additional storage may be requested from a storage manager. If additional storage is available, the storage manager will increase the storage allocated to the incoming video stream. If additional storage is not available, then an already stored video program may be selected for reduction based on the stored program type, age of the program in storage, assigned priority, a user assigned data resolution minimum, or some other suitable basis. In one embodiment, a user profile of previous data reductions selected by the user may be utilized by data manager to make decisions regarding data reduction of the present incoming video stream. For example, if in the past the user has generally selected comedy programs for reduction, the data manager may locate and compress any stored comedy programs.

In one embodiment, a "look-ahead" data reduction scheme is employed whereby programs that have been selected for viewing are assessed for data storage requirements. Prior to the program actually arriving at the STB or PVR, the STB disk or PVR is assessed for available storage. If the available storage is insufficient to store the incoming video stream or program, a DRF is selected to further reduce the data comprising the stored video programs and the incoming video stream. In a preferred embodiment, an STB or PVR controller either performs local data reduction or compression or optionally sends a message to the head-end or other originator of an incoming video stream and requests that data compression or data reduction be performed at the head-end or originator so that the incoming video stream is broadcast or transmitted to the STB or PVR in a reduced data or compressed format, thereby reducing the bandwidth required for transmission and the storage required at the local STB disk or PVR.

Figure 6:
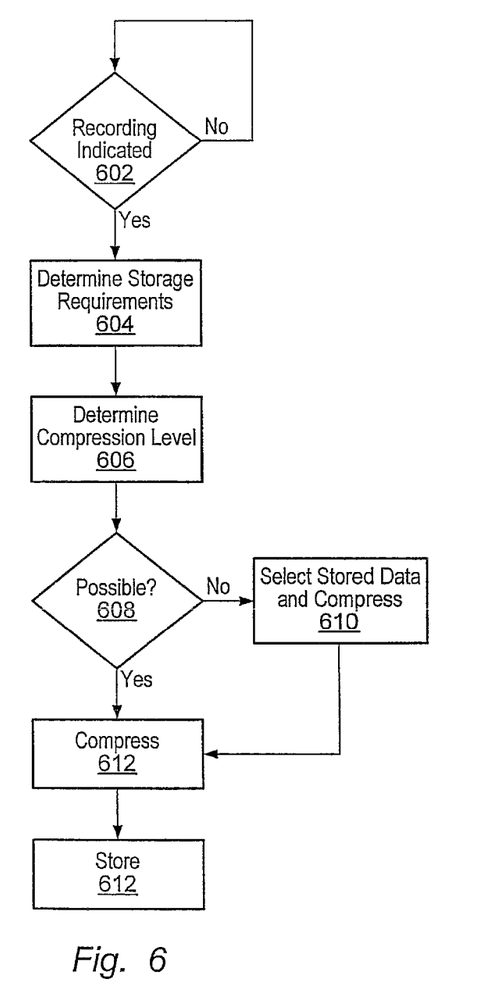
FIG. 6 illustrates one embodiment of a method for compressing data.

Turning now to FIG. 6, one embodiment of a method corresponding to the above description is provided. Generally speaking, the processes described in FIG. 6 may occur within a viewer's STB, PVR, or related receiving device. In response to detecting an indication to record a particular television program or other data (decision block 602), a determination may be made as to the amount of storage required to accommodate storage of the program (block 604). It is noted that detection (block 602) of an indication to record a program may be in response to an explicit request received from a viewer, a pre-programmed request to record shows of a given type, or an automatic indication that may occur in response to detecting a program the viewer may wish to record based on the viewer's viewing habits, demographics, etc.

In one embodiment, the recording indication may correspond to a program which is to air at a much later date. For example, the STB may be configured to continuously monitor received electronic program guide data (e.g., EIT data) for program or other data which have been requested by the viewer or match some profile corresponding to the viewer. Such EIT or other data may further include an indication as to the total amount of data in the broadcast program. For example, as described above there may be included a duration D and data rate Ri from which the incoming data storage requirements Si may be determined. Other methods for indicating a programs total data are possible and are contemplated.

Subsequent to determining the storage requirements (block 604), a determination may be made (decision block 606) as to a particular data reduction factor DRF (i.e., level of compression) desired. Such an indication may be made explicitly by the viewer (e.g., quality level highest, compression level greatest, etc.) or could by automatically determined based on factors such as the amount of storage space available, the type of program indicated, or otherwise. Alternatively, a default compression level may be utilized if no DRF indication is detected (decision block 606). Subsequent to determining the desired level of compression and corresponding storage space required, a determination is made (decision block 608) as to whether there is sufficient storage space available for the proposed recording. If there is sufficient space (decision block 608), then the program may be subsequently compressed (block 612) using the desired DRF and stored (block 614). It is noted that the desired compression which is indicated may be no compression, in which case compression processing at block 612 is simply bypassed.

In the event there is insufficient space to accommodate the proposed recording (decision block 608), previously stored data may be identified (block 610) for compression or removal. Data or programs identified for removal may correspond to those which are older, those which are of a particular type, those which have already been viewed at least once, or otherwise. Numerous such identification techniques are possible. Upon identifying a particular program (block 610) for compression, the amount of compression required for the already stored program is determined. Generally speaking, the amount of compression required may be the minimum amount necessary to enable storage of the proposed program. In some cases it may be necessary to compress more than one stored program to make room for the proposed recording.

In one embodiment, the stored data has already been compressed (e.g., using MPEG compression) and further compression of the already stored program is accomplished by removing high frequency block characteristics as described in the '561 patent. In this manner it may not be necessary to decompress the stored data in order to accomplish the size reduction and corresponding processing demands placed upon the STB may be reduced. Alternative embodiments may include techniques which decompress then recompress the stored data, or compress stored data which has not yet been compressed.

In addition to the above, programs and data may have explicitly, or implicitly, determined priorities. For example, sporting events may be given a higher priority by a viewer than dramas. Priorities may also be implicitly determined, for example, based on the viewing habits of a particular viewer. Other factors discussed above, such as the age and/or type of a stored program may also imply a particular priority. In the event multiple recordings are indicated as being desired, the STB may be configured to compare priorities in order to determine which of the proposed recordings takes precedence. Comparisons may also be made between desired recordings and already stored recordings. For example, if it is not possible to store a proposed recording without deleting a currently stored program, and the proposed recording has a lower priority than all of the currently stored data, then the proposed recording may be rejected by the STB and not recorded.

Figure 7:
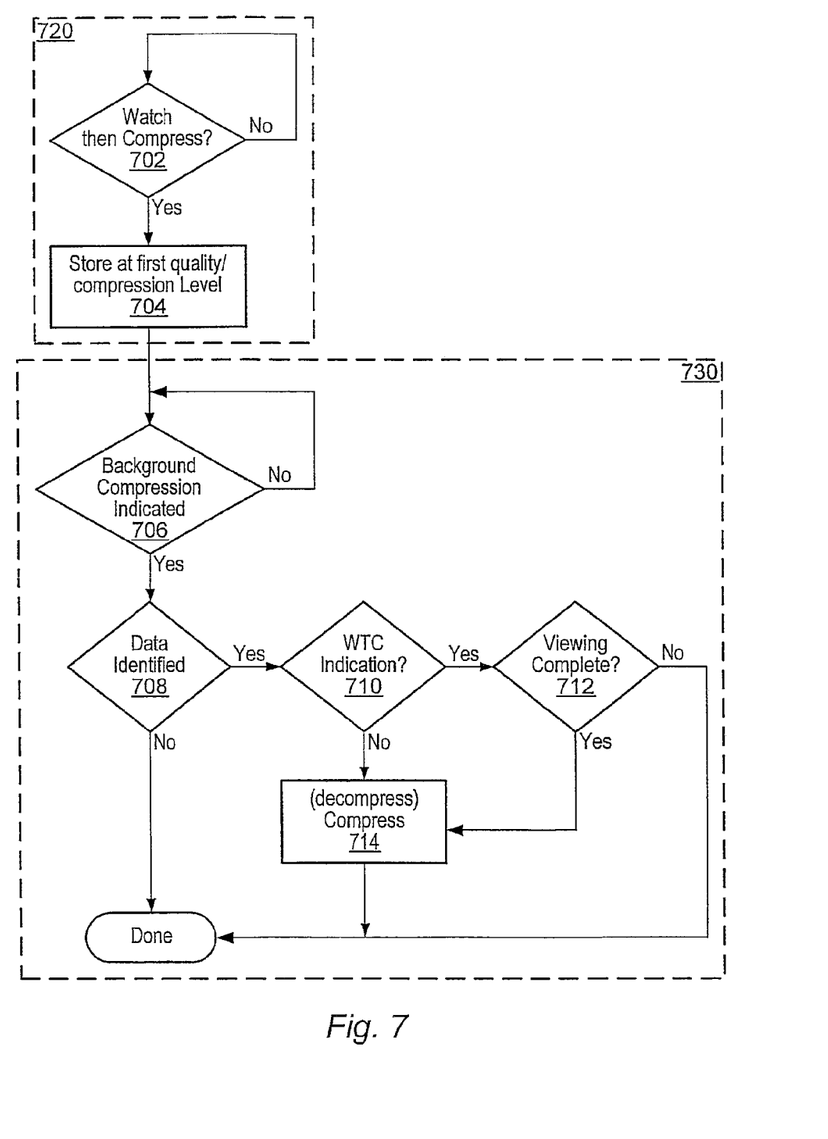
FIG. 7 illustrates one embodiment of a method for compressing data.

FIG. 7 illustrates another embodiment of a method for recording and compressing data. In the embodiment shown, a viewer may indicate a desire to record a particular program (decision block 702). In this embodiment, the viewer may want to view the program at a highest quality. However, subsequent to viewing the program, the STB may store the program at a lower quality level. Such an indication may be referred to as a Watch-Then-Compress (WTC) indication. Subsequent to receiving the program, it is stored at the first (generally higher) quality level (block 704).

Decision block 706 indicates a state wherein a background compression has been detected. A "background" compression may correspond to a background process in a multi-tasking environment, or may simply be a process occurring during off hours (e.g., late at night). For example, such an indication (decision block 706) may be in response to a prescheduled event. It is noted that FIG. 7 depicts two blocks of processes (720 and 730) which do not necessarily occur in any given order with respect to one another. For example, block 720 is shown to directly precede block 730. However, each of blocks 720 and 730 may operate in the reverse order or concurrently.

If a background compression is indicated or otherwise detected (decision block 706), data which has already been stored is identified for compression (decision block 708). Such a process may be similar to that described in block 610 of FIG. 6. If no stored data is identified as a candidate for compression, the process ends. Alternatively, if particular data is identified for compression (or removal) in block 708, the selected data may first checked to see if it includes a WTC indication (decision block 710). If it does not include a WTC indication, then compression of the identified data is performed (block 714). Alternatively, if a WTC indication is detected (block 710), a determination is made as to whether or not the identified data has been completely viewed (decision block 712). If so, then compression (block 714) may be performed. If the program has not been completely viewed (decision block 712), then the process ends. Alternative embodiments may compress those parts of a WTC program which been viewed, prior to the entire program being viewed.

While the present invention has been described in the context of an interactive television system, it may also be embodied in a distributed computer system comprising a server and a client device. In another embodiment, the present invention is implemented as a set of instructions on a computer readable medium, comprising ROM, RAM, CD ROM, Flash or any other computer readable medium, now known or unknown that when executed cause a computer to implement the method of the present invention.

While the foregoing disclosure is directed to particular embodiments of the invention, various modifications will be apparent to those skilled in the art. It is intended that all variations within the scope and spirit of the appended claims be embraced by the foregoing disclosure. Examples of the more important features of the invention have been summarized rather broadly in order that the detailed description thereof that follows may be better understood, and in order that the contributions to the art may be appreciated.

What is claimed is:

1. A method for using a look-ahead data reduction scheme in a distributed data processing system, the method comprising:
   receiving an indication to store a program at a client device, the indication being received prior to the program being received at the client device;
   accessing a user profile of a user associated with the client device, the user profile including data indicating programs in the past that were selected by the user for compression;
   determining whether a data storage device coupled to the client device has available storage capacity sufficient to store the program based on a data storage requirement for the program; and
   in response to determining the data storage device does not have available storage capacity sufficient to store the program,
      selecting one of a plurality of discrete data reduction factors for compressing the program based on the available storage capacity of the data storage device, the data storage requirement for the program, and the data indicating programs in the past that were selected by the user for compression,
      sending a message to a provider of the program to compress the program according to the selected discrete data reduction factor prior to the program being conveyed to the client device, and
      receiving the compressed program from the provider, wherein the provider has compressed the program and conveyed the compressed program to the client device in response to receiving the message.

2. The method as recited in claim 1, wherein the compressed program is broadcast to the client device.

3. The method as recited in claim 1, further comprising the provider compressing the program by an amount sufficient to permit the compressed program to be stored on the client device.

4. The method as recited in claim 1, further comprising rejecting the indication to store the program in response to determining:
   the data storage device does not have available storage capacity sufficient to store the compressed program without deleting one or more currently stored programs; and
   a priority of the program is lower than a priority of each of the currently stored programs.

5. The method as recited in claim 4, wherein the provider conveys the program to the client device according to a program schedule guide.

6. The method as recited in claim 1, further comprising the client device further compressing the program subsequent to the program being viewed.

7. The method as recited in claim 6, further comprising the client device storing the received compressed program, retrieving and further compressing the program, and restoring the further compressed program.

8. The method as recited in claim 1, wherein the client device comprising one of a television, a set top box, a personal digital assistant, or a cellular phone.

9. The method of claim 1, further comprising:
   calculating the data storage requirement for the program based on a duration of the program and a data rate for the program provided in electronic program guide information.

10. A client device for use in a distributed data processing system, wherein the client device is configured to:
    receive an indication to store a program at a client device, the indication being received prior to the program being received at the client device;
    access a user profile of a user associated with the client device, the user profile including data indicating programs in the past that were selected by the user for compression;
    determine whether a data storage device coupled to the client device has available storage capacity sufficient to store the program based on a data storage requirement for the program; and
    in response to determining the data storage device does not have available storage capacity sufficient to store the program,
       select one of a plurality of discrete data reduction factors for compressing the program based on the available storage capacity of the data storage device, the data storage requirement for the program, and the data indicating programs in the past that were selected by the user for compression,
       send a message to a provider of the program to compress the program according to the selected discrete data reduction factor prior to the program being conveyed to the client device, and
       receive the compressed program from the provider, wherein the provider has compressed the program and conveyed the compressed program to the client device in response to receiving the message.

11. The client device as recited in claim 10, wherein the compressed program is received by the client device via broadcast to the client device.

12. The client device as recited in claim 10, wherein the compressed program is compressed by an amount sufficient to permit the compressed program to be stored on the client device.

13. The client device as recited in claim 10, wherein the client device is further configured to reject the indication to store the program in response to determining:

the data storage device does not have available storage capacity sufficient to store the compressed program without deleting one or more currently stored programs; and a priority of the program is lower than a priority of each of the currently stored programs.

14. The client device as recited in claim 13, wherein the program is received by the client device at a time determined by a program schedule guide.

15. The client device as recited in claim 10, wherein the client device is configured to further compress the program subsequent to the program being viewed.

16. The client device as recited in claim 10, wherein the client device is configured to store the received compressed program, retrieve and further compress the program, and restore the further compressed program.

17. The client device as recited in claim 10, wherein the client device comprises one of a television, a set top box, a personal digital assistant, or a cellular phone.

18. A system comprising:

a head-end configured to convey content to client devices for viewing;

a plurality of client devices coupled to receive the content;

wherein a client device of the client devices is configured to:

receive an indication to store a content item at a client device, the indication being received prior to the content item being received at the client device;

access a user profile of a user associated with the client device, the user profile including data indicating content items in the past that were selected by the user for compression;

determine whether a data storage device coupled to the client device has available storage capacity sufficient to store the content item based on a data storage requirement for the the content item; and in response to determining the data storage device does not have available storage capacity sufficient to store the content item, select one of a plurality of discrete data reduction factors for compressing the content item based on the available storage capacity of the data storage device, the data storage requirement for the content item, and the data indicating content items in the past that were selected by the user for compression, send a message to the head-end to compress the content item according to the selected discrete data reduction factor prior to the content item being conveyed to the client device, and receive the compressed content item from the head-end, wherein the head-end has compressed the content item and conveyed the compressed content item to the client device in response to receiving the message.

19. The system as recited in claim 18, wherein the client device comprises one of a television, a set top box, a personal digital assistant, or a cellular phone.

* * * * *

UNITED STATES PATENT AND TRADEMARK OFFICE
CERTIFICATE OF CORRECTION

PATENT NO. : 9,712,799 B2
APPLICATION NO. : 12/795425
DATED : July 18, 2017
INVENTOR(S) : Alain Delpuch Page 1 of 1

It is certified that error appears in the above-identified patent and that said Letters Patent is hereby corrected as shown below:

On the Title Page

In Column 2, under "Foreign Patent Documents", Line 2, delete "WO-2004023346 a2" and insert --WO-2004023346 A2-- therefor On page 2, in Column 2, under "Other Publications", Line 9, delete ""Application U.S." and insert --"U.S.-- therefor In the Claims In Column 12, Line 8, in Claim 18, after "for the", delete "the"

Signed and Sealed this
Twenty-eighth Day of May, 2019

Andrei Iancu
*Director of the United States Patent and Trademark Office*